(12) United States Patent
Azzouz et al.

(10) Patent No.: US 11,575,166 B2
(45) Date of Patent: Feb. 7, 2023

(54) DEVICE FOR REGULATING THE TEMPERATURE OF A BATTERY USING A DIELECTRIC FLUID, AND BATTERY PACK COMPRISING SUCH A DEVICE

(71) Applicant: Valeo Systemes Thermiques, Le Mesnil-Saint-Denis (FR)

(72) Inventors: Kamel Azzouz, Le Mesnil Saint Denis (FR); Amrid Mammeri, Le Mesnil Saint Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 122 days.

(21) Appl. No.: 16/769,884

(22) PCT Filed: Dec. 14, 2018

(86) PCT No.: PCT/FR2018/053294
§ 371 (c)(1),
(2) Date: Jun. 4, 2020

(87) PCT Pub. No.: WO2019/115972
PCT Pub. Date: Jun. 20, 2019

(65) Prior Publication Data
US 2021/0184295 A1 Jun. 17, 2021

(30) Foreign Application Priority Data
Dec. 14, 2017 (FR) ..................... 1762159

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/615* (2015.04); *H01M 10/6569* (2015.04)

(58) Field of Classification Search
CPC ............ H01M 10/65; H01M 10/6568; H01M 10/6569; H01M 10/613; H01M 10/615
See application file for complete search history.

(56) References Cited

U.S. PATENT DOCUMENTS

| 8,486,553 B2 * | 7/2013 | Kim | H01M 50/20 429/120 |
| 2012/0247713 A1 * | 10/2012 | Radermacher | H01M 10/63 165/41 |
| 2013/0122331 A1 * | 5/2013 | McDonald | H01M 10/6556 429/50 |

FOREIGN PATENT DOCUMENTS

| CN | 101069284 A | 11/2007 |
| CN | 101449637 A | 6/2009 |

(Continued)

OTHER PUBLICATIONS

The First Office Action issued in corresponding Chinese Application No. 201880079757.0, dated Mar. 31, 2021 (12 pages).
(Continued)

*Primary Examiner* — Karie O'Neill Apicella
(74) *Attorney, Agent, or Firm* — Osha Bergman Watanabe & Burton LLP

(57) ABSTRACT

A device for the thermal regulation of a battery comprising at least one energy storage cell, said device comprising a dielectric-fluid circuit, said circuit comprising irrigating means for wetting the surface of said cell with said dielectric fluid.

13 Claims, 3 Drawing Sheets

Figure 1:
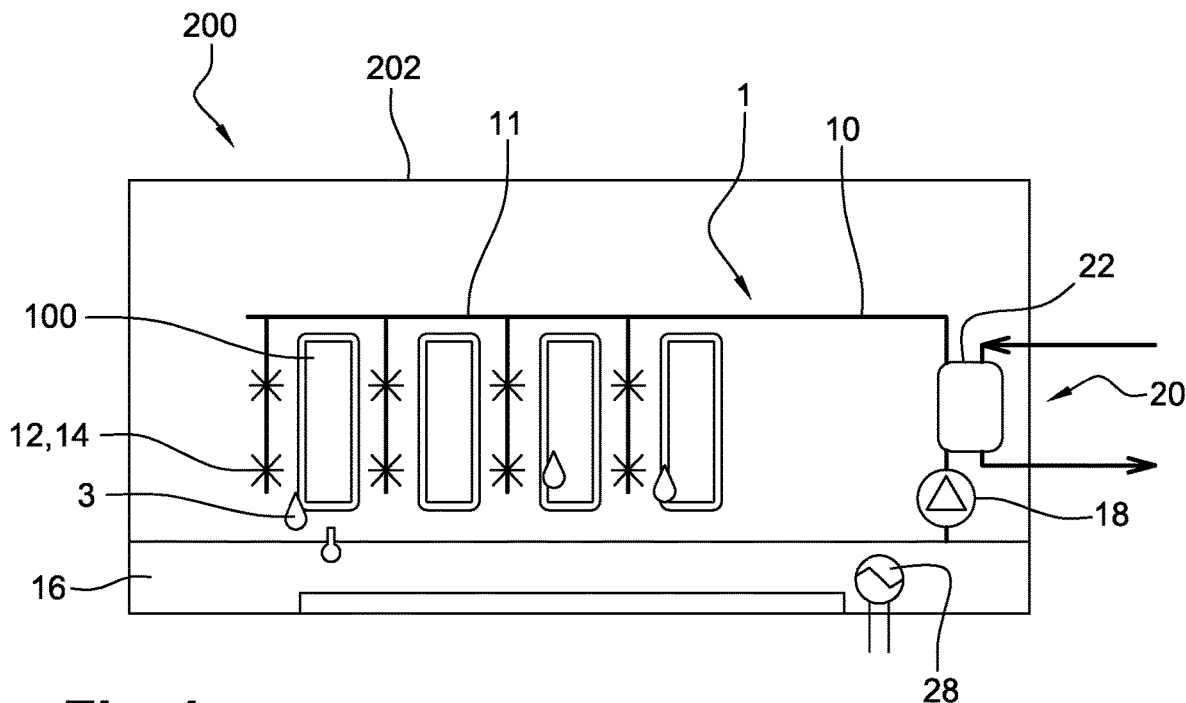

(51) Int. Cl.
*H01M 10/615* (2014.01)
*H01M 10/6569* (2014.01)

(56) References Cited

FOREIGN PATENT DOCUMENTS

| CN | 103107384 | A | | 5/2013 | | |
|---|---|---|---|---|---|---|
| CN | 104969409 | A | | 10/2015 | | |
| CN | 105846009 | A | | 8/2016 | | |
| CN | 105977572 | A | * | 9/2016 | .......... | H01M 10/625 |
| EP | 2993435 | A1 | | 3/2016 | | |
| EP | 3166175 | A1 | | 5/2017 | | |
| WO | 2011137111 | A1 | | 11/2011 | | |
| WO | 2013006796 | A1 | | 1/2013 | | |
| WO | 2013123269 | A1 | | 8/2013 | | |

OTHER PUBLICATIONS

International Search Report and Written Opinion in corresponding International Application No. PCT/FR2018/053294, dated Apr. 8, 2019 (10 pages).

\* cited by examiner

DEVICE FOR REGULATING THE TEMPERATURE OF A BATTERY USING A DIELECTRIC FLUID, AND BATTERY PACK COMPRISING SUCH A DEVICE

The invention relates to a device for regulating the temperature of the cells of a battery using a dielectric fluid. The invention also relates to a battery pack comprising said device and a plurality of battery cells. It is intended in particular to equip motor vehicles, particularly electrically-powered or hybrid-powered motor vehicles.

As the market share represented by electric vehicles continues to grow, the problems of cooling/heating the battery packs with which they are equipped are adopting strategic importance. The objective is to design the best-performing, most efficient and economical battery thermal management device possible.

Often, in order to meet the cooling/heating needs of electric batteries, use is made of "heat exchangers" that consist of a cold plate with a circulation of liquid coolant, the plates being in contact with the cells that are to be cooled. This kind of technique leads to non-uniform cooling of the batteries and thus limits battery life and performance. These devices also exhibit high thermal resistance because of the thicknesses of material present between the liquid coolant and the cells.

One proposed solution for addressing this set of problems is to immerse the electric batteries in a dielectric heat-transfer fluid. This immersion can be achieved with a circulation of fluid or under static conditions involving a phase change.

These two techniques perform well from a thermal standpoint, particularly on account of the direct contact established between the liquid and the cells, but have the disadvantage of using a large quantity of dielectric liquid, thereby increasing the cost and weight of the battery pack.

The invention seeks to solve these technical problems by proposing a device for the thermal regulation of a battery comprising at least one energy storage cell, said device comprising a dielectric-fluid circuit, said circuit comprising irrigating means for wetting the surface of said cell with said dielectric fluid.

What is meant by an irrigating means is any type of means that allows the dielectric fluid to be brought into contact with the surface or surfaces of the battery cells in some way other than by immersing said cells in said dielectric fluid.

It is, in particular, a sprinkling means, spraying means, or any means able to cause a circulation of said fluid in such a way as to bring the dielectric fluid into contact with the surface of the cells in the form of a film of fluid, of jets, of droplets, of a mist, or the like.

This device not only makes it possible to collect a large amount of heat and provide uniform cooling through direct contact between the dielectric fluid in the cells that are to be cooled, but also makes it possible to limit the quantity of dielectric fluid and therefore the weight of the device by eliminating the bath of dielectric liquid known from the earlier devices.

The invention may also comprise any one of the following features, considered individually or in any technically possible combination:
- the irrigation means comprise sprinkler nozzles for sprinkling the dielectric fluid, notably in the liquid phase,
- the sprinkler nozzles are configured to be positioned between each of the battery cells so as to spray the dielectric fluid onto the lateral faces of the cells,
- the sprinkler nozzles are configured to be positioned above each of the battery cells so as to spray the dielectric fluid onto the upper faces of the cells,
- the sprinkler nozzles are configured to produce a jet of dielectric fluid,
- the fluid is intended to vaporize at least partially at the surface of the cells,
- the sprinkler nozzles are configured to spray the dielectric fluid in the form of fine droplets, intended to flow over the surface of the cells,
- the device comprises a reservoir configured to be positioned under the cells and able to recover, in liquid phase, the dielectric fluid that has been sent over the surface of the battery cells.
- the device comprises a pump configured to draw said dielectric fluid from the reservoir and pressurize it in said dielectric-fluid circuit,
- the device comprises at least one cooling means for cooling the dielectric fluid,
- the cooling means for cooling the dielectric fluid comprises a heat exchanger situated in the dielectric-fluid circuit,
- the cooling means for cooling the dielectric fluid comprises a heat exchanger situated in the reservoir,
- the cooling means comprises a condenser configured to condense the dielectric fluid in order to change from the vapor phase to the liquid phase and cause said fluid to trickle as far as the reservoir,
- the condenser is configured for the circulation of a coolant fluid intended to exchange heat with the dielectric fluid,
- the cooling means comprises a heat exchanger allowing an exchange of heat between a refrigerant fluid and a coolant fluid,
- the condenser is configured for the circulation of said coolant fluid for the purposes of exchanging heat with the dielectric fluid,
- the device comprises at least one heating means for heating the dielectric liquid,
- the heating means is situated in the reservoir.

The invention also relates to a battery pack comprising said device described hereinabove and a plurality of battery cells.

Figure 2:
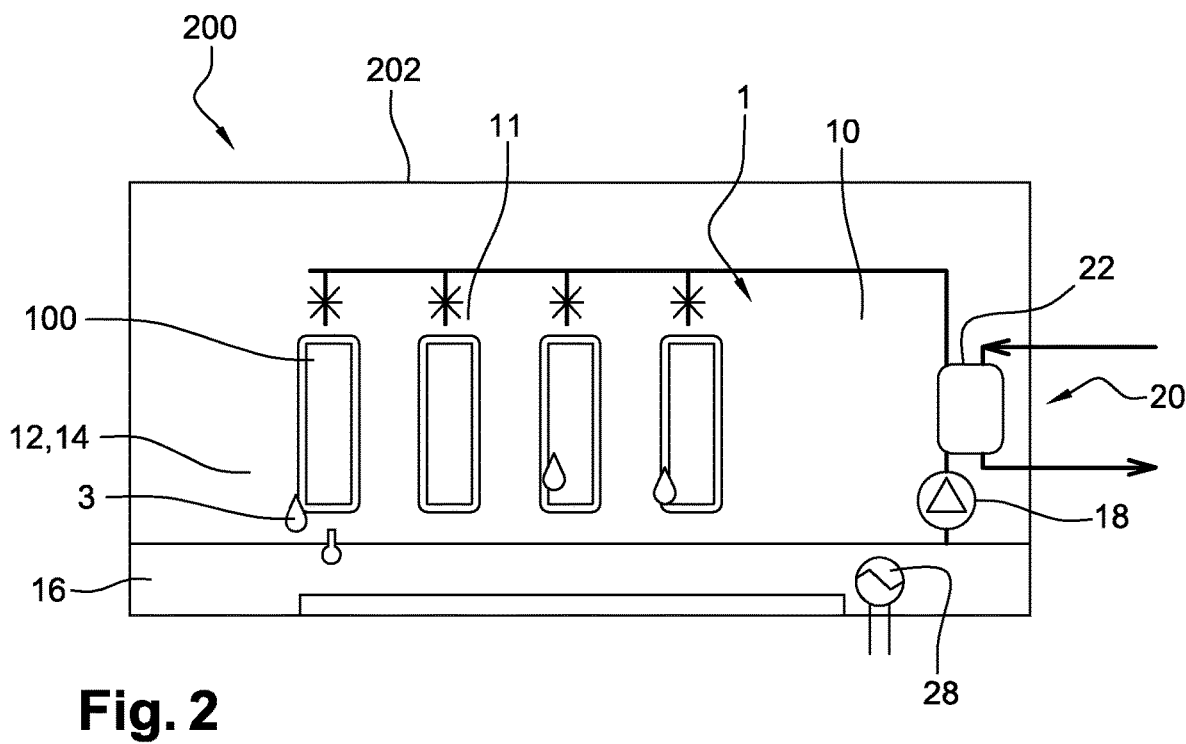
Figure 3:
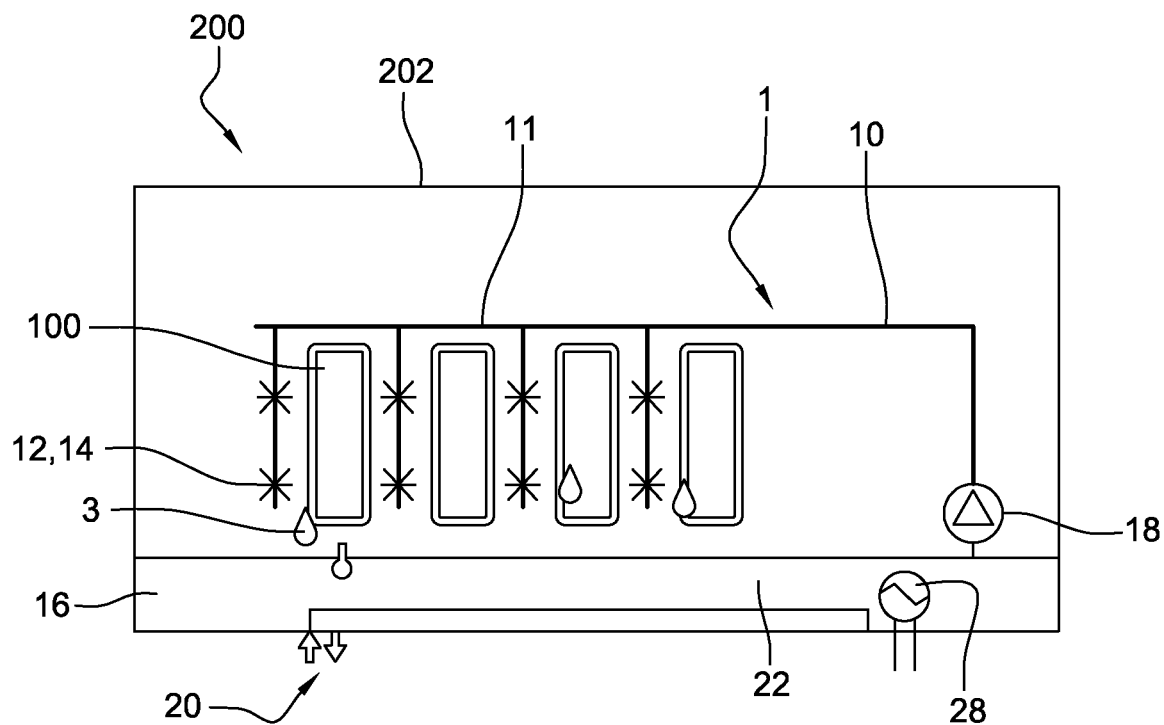
Figure 4:
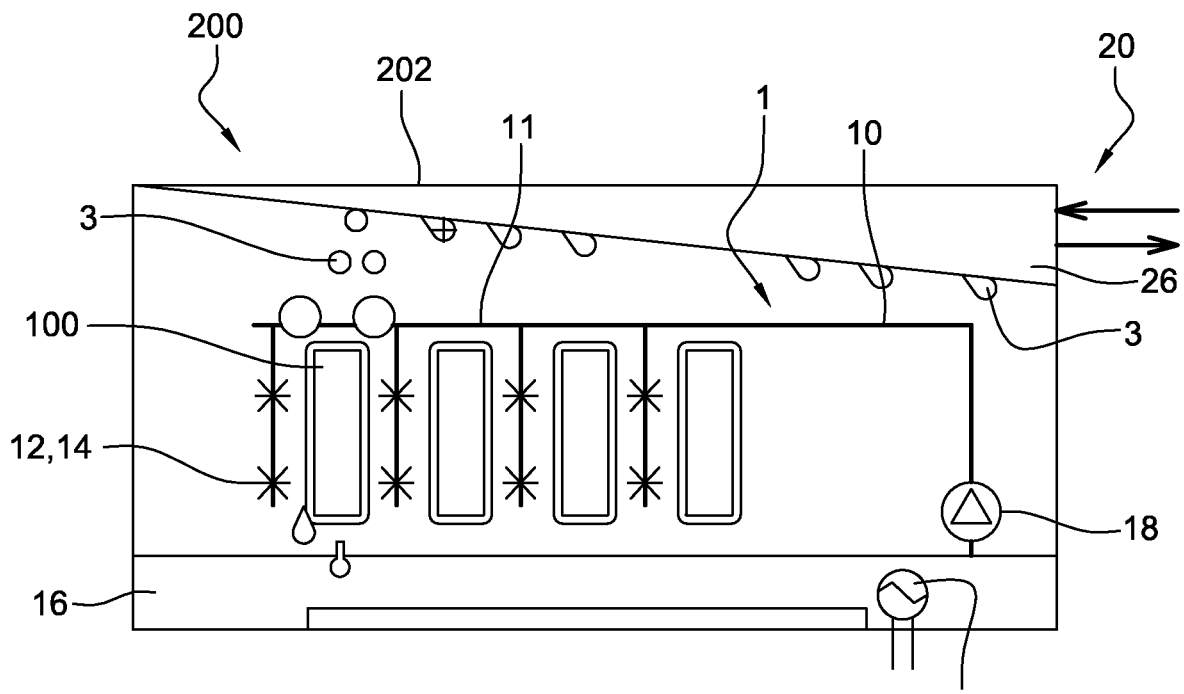
Figure 5:
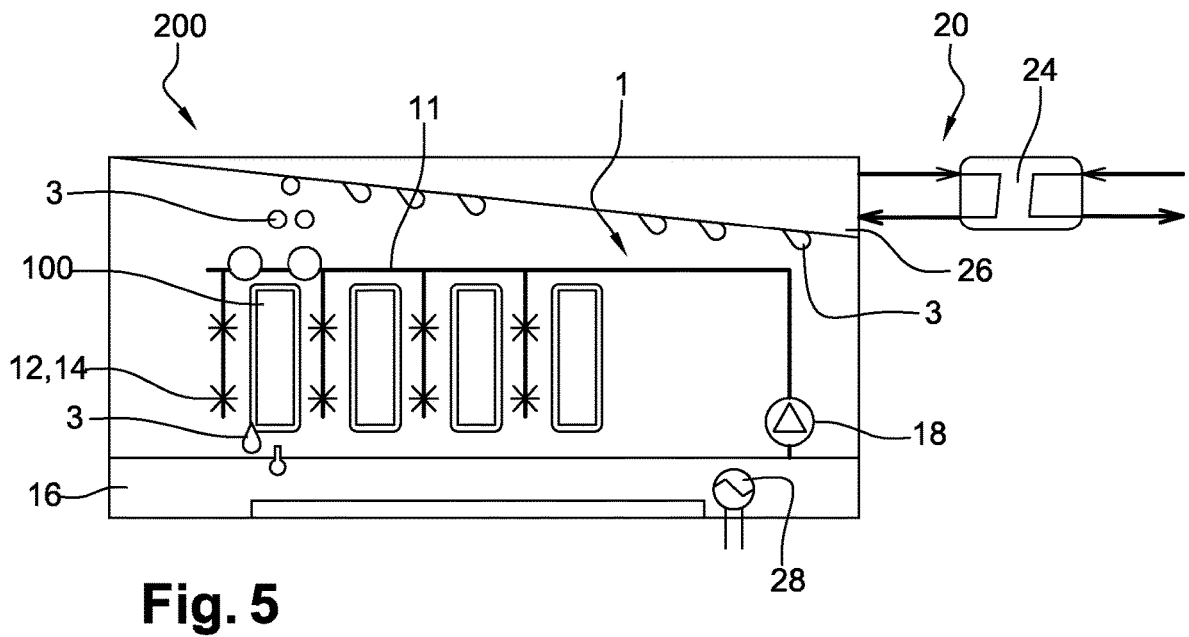
Figure 6:
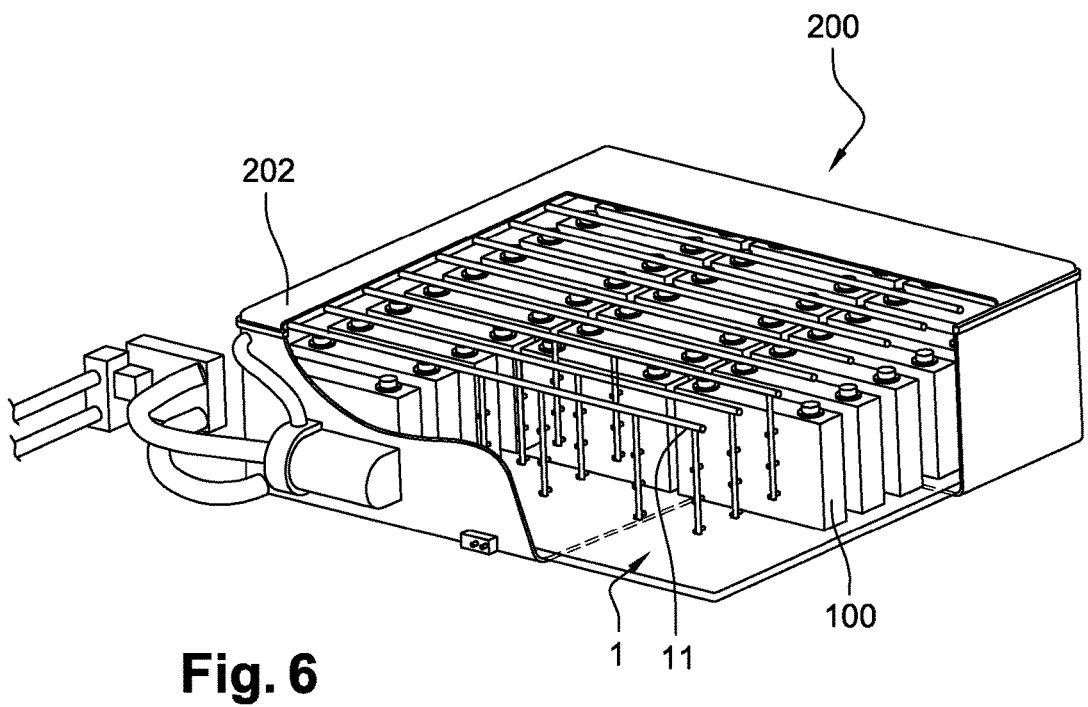

The invention will be better understood and further details, features and advantages of the invention will become apparent from reading the following description given by way of non-limiting example and with reference to the appended drawings, in which:

FIG. 1 schematically illustrates a view in section of a first embodiment of a device according to the invention, FIG. 2 schematically illustrates a view in section of a second embodiment of a device according to the invention, FIG. 3 schematically illustrates a view in section of a third embodiment of a device according to the invention, FIG. 4 schematically illustrates a view in section of a fourth embodiment of a device according to the invention, FIG. 5 schematically illustrates a view in section of a fifth embodiment of a device according to the invention, FIG. 6 is a perspective view, with partial cutaway, of a battery pack according to the invention.

As illustrated in FIG. 1, the invention relates to a device 1 for regulating the temperature of a battery. Said battery comprises at least one energy-storage cell 100. It is notably an electric-vehicle battery. The battery here comprises four cells 100 but this is merely one schematic example, and the battery could comprise a far higher number of cells.

In order for batteries to operate correctly, it is desirable for their temperature to be maintained within a tight band of values, notably between 20 and 40° C. The device according to the invention specifically has the function of performing such temperature regulation.

Said device 1 comprises a dielectric-fluid circuit 10 and irrigation means 12 for irrigating the surface of the cell 100 with said dielectric fluid 3. The dielectric-fluid circuit 10 may be formed by a plurality of dielectric-fluid 3 supply ducts or supply lines 11 supplying the irrigation means 12.

The circuit 10 is a closed circuit in which the dielectric fluid is made to change phase, or not, according to the various embodiments developed hereinafter.

The means 12 allow effective regulation of the temperature of the battery cells 100 by irrigating them while at the same time limiting the quantity of dielectric fluid 3 used. Specifically, the device 1 according to the invention requires a far smaller quantity of fluid 3 than is required in a device in which the cells are immersed in a dielectric fluid.

Advantageously, the irrigation means 12 comprise sprinkler nozzles 14 for sprinkling the dielectric fluid, in the liquid phase. Said sprinkler nozzles 14 allow the fluid 3 to be sprinkled in the direction of any one of the surfaces of the battery cell or cells 100. The sprinkling of the fluid 3 by the nozzles 14 may be monodirectional or multidirectional.

According to one embodiment depicted in FIG. 1, the sprinkler nozzles 14 are configured to be positioned between each of the battery cells 100 so as to spray the dielectric fluid 3 onto the lateral faces of the cells 100. This layout of the sprinkler nozzles 14 makes it possible to cover a maximum surface area of cells 100 and thus optimize the temperature regulation.

According to another embodiment depicted in FIG. 2, the sprinkler nozzles 14 are configured to be positioned above each of the battery cells 100 so as to spray the dielectric fluid 3 onto the upper faces of the cells 100. The Applicant Company has found that the zones of the cells 100 that experience the greatest rises in temperature during use of the battery are the upper zones, in the region of the electrical connections. This layout of the sprinkler nozzles 14 thus allows the high-temperature zones to be targeted more specifically and therefore makes it possible to optimize the temperature regulation.

According to one embodiment, said sprinkler nozzles 14 are configured in such a way as to produce a jet 5 of dielectric fluid 3 in the liquid phase.

The jet 5 of dielectric fluid 3 may be variable in power. Said fluid 3 may thus impinge on the surface of the cell 100. Said fluid 3 may alternatively trickle along the surface of said cell 100 without impact. The jet 5 may be monodirectional or multidirectional.

According to another embodiment, the sprinkler nozzles 14 are configured in such a way as to spray the dielectric liquid 3 in the form of fine droplets 7. The size of the droplets 7 may be variable. The sprinkler nozzles may notably be configured in such a way as to create a mist of the fluid 3. The spraying of the fluid 3 may be monodirectional or multidirectional.

The jet 5 and the droplets 7 of dielectric fluid are not depicted in the figures.

During the course of the use of the battery, the cells 100 experience a temperature higher than the temperature of the fluid 3. Said fluid 3 may thus be intended to vaporize at least partially at the surface of the cells 100 (FIGS. 4 and 5 in particular).

The device 1 may also comprise a reservoir 16 supplementing the circuit 10 and configured to be positioned beneath the cells 100. Said reservoir 16 is able to recover the dielectric liquid 3 sent onto the surface of the battery cells 100.

The device 1 may also comprise a pump 18 configured to draw said dielectric fluid 3 from the reservoir 16 and pressurize it in said dielectric-fluid circuit 10.

Once the fluid 3 has irrigated the surface of the cells 100, said fluid trickles back to the reservoir 16. The fluid 3 thus recovered by the reservoir 16 is then drawn up by a pump 18 and then re-pressurized downstream in the circuit 10.

Thus, the dielectric fluid 3 finds itself successively under pressure and then at the pressure of a housing 202 that houses the cells 100 along the circuit 10. Here, it is at the pressure of the housing 202 in contact with the cells 100 and then in the reservoir 18, before being pressurized once again under the action of the pump 18 in the line or lines 11 and the sprinkler nozzles 14. The dielectric fluid 3 is therefore constantly reused. It is thus possible to use a small quantity of dielectric fluid 3, particularly by comparison with the devices in which the cells are immersed in the dielectric liquid.

Advantageously, the device 1 comprises at least one cooling means 20 for cooling the dielectric fluid 3. When the fluid 3 comes into contact with a cell 100, said fluid collects the heat dissipated by the battery cell. The fluid 3 is then cooled by said cooling means 20 before being brought back into contact with the surface of the cells 100. The fluid 3 thus experiences a cycle of change of state and/or of temperature increase and decrease.

According to one embodiment depicted in FIG. 1, the cooling means 20 comprises a heat exchanger 22 situated in the dielectric-fluid circuit 3 in this instance downstream of the pump 18. Thus, after having experienced an increase in temperature following contact with a cell 100, the fluid 3 is recovered by the reservoir 16, drawn up by the pump 18 and then experiences a decrease in temperature under the action of the heat exchanger 22. The fluid 3 is thus carried along the circuit as far as the sprinkler nozzles, comes once again into contact with the cells 100, and once again experiences an increase in temperature.

According to one embodiment depicted in FIG. 3, the cooling means 20 for cooling the dielectric fluid 3 comprises a heat exchanger 22 situated in the reservoir. The cooling of the dielectric fluid 3 is performed here upstream of the pump 18. It is then drawn up by the pump 18. This arrangement makes it possible to use a heat exchanger 22 in the form of a plate which can have a heat-exchange area of larger dimensions than in the case of a heat exchanger situated downstream of the pump 18. Thus, the exchange of temperature between the dielectric fluid 3 and the heat exchanger 22 is improved.

According to one embodiment depicted in FIG. 4, the dielectric fluid 3 experiences a change in phase, and vaporizes, at least partially, when it comes into contact with the surfaces of the cells 100. The cooling means 20 according to this embodiment comprises a condenser 26 configured to condense the dielectric fluid 3 in order to change from the vapor phase to the liquid phase and cause said fluid 3 to trickle as far as the reservoir 16, notably by virtue of an inclined plane. The liquid-phase fluid 3 in the reservoir 16 is then drawn up by the pump 18. The condenser 26 allows the dielectric fluid 3 to be condensed by virtue of a difference in temperature between the condenser and the vapor-phase dielectric fluid.

Advantageously, the condenser 26 is configured for the circulation of a refrigerant fluid intended to exchange heat with the dielectric fluid 3. The refrigerant comes from an expansion valve and circulates through the condenser 26 in such a way as to lower the temperature of the condenser. The condenser 26 therefore allows the gaseous dielectric fluid 3 to be condensed.

According to an embodiment depicted in FIG. 5, the cooling means 20 further comprises a heat exchanger 24 allowing an exchange of heat between a refrigerant fluid and a coolant fluid. The condenser 26 according to this embodiment is configured for the circulation of the coolant fluid with a view to exchanging heat with the vapor-phase dielectric fluid 3.

When the cells are at too low a temperature, it may be advantageous to increase their temperature. When a battery is being used under low-temperature conditions, for example below 0° C., it is advantageous to be able to increase the temperature of the battery cells 100 in order to obtain optimal performance sooner.

Thus, the device 1 according to the present invention may comprise a heating means 28 for heating the dielectric fluid 3. The heating means 28 then allows heating of the fluid 3, which will in turn heat the cells 100 to an optimal working temperature. Said heating means 28 may notably be a resistive element.

As illustrated in FIGS. 1 to 5, the heating means 28 for heating the dielectric fluid 3 is, here, situated in the circuit 10, advantageously situated in the reservoir 16.

The present invention also relates to a battery pack 200 comprising a device 1 described hereinabove and a plurality of battery cells 100.

The plurality of cells 100 and the plurality of supply lines 11 of the pack can be better seen in FIG. 6. In this instance, the lines are in parallel.

The invention claimed is:

1. A device for the thermal regulation of a battery comprising at least one energy storage cell, said device comprising:
   a dielectric-fluid circuit comprising irrigating means for wetting the surface of said cell with a dielectric fluid that vaporizes at least partially at the surface of the cell,
   wherein the irrigation means comprise sprinkler nozzles for sprinkling the dielectric fluid, in the liquid phase, and
   wherein a first portion of the sprinkler nozzles are configured to be positioned between each of the battery cells so as to spray the dielectric fluid onto lateral faces of the cells.

2. The device as claimed in claim 1, wherein a second portion of the sprinkler nozzles are configured to be positioned above each of the battery cells so as to spray the dielectric fluid onto upper faces of the cells.

3. The device as claimed in claim 1, wherein the sprinkler nozzles are configured in such a way as to produce a jet of dielectric fluid.

4. The device as claimed in claim 1, wherein the sprinkler nozzles are configured in such a way as to spray the dielectric fluid in the form of fine droplets, intended to flow over the surface of the cells.

5. The device as claimed in claim 1, further comprising: a reservoir configured to be positioned under the cells and able to recover, in liquid phase, the dielectric fluid that has been sent over the surface of the battery cells, and a pump configured to draw said dielectric fluid from the reservoir and pressurize it in said dielectric-fluid circuit.

6. The device as claimed in claim 5, further comprising at least one cooling means for cooling the dielectric fluid.

7. The device as claimed in claim 6, wherein the cooling means for cooling the dielectric fluid comprises a heat exchanger situated in the dielectric-fluid circuit.

8. The device as claimed in claim 6, wherein the cooling means for cooling the dielectric fluid comprises a heat exchanger situated in the reservoir.

9. The device as claimed in claim 6, wherein the cooling means comprises a condenser configured to condense the dielectric fluid to change from the vapor phase to the liquid phase and cause said fluid to trickle as far as the reservoir.

10. The device as claimed in claim 9, wherein the condenser is configured for the circulation of a refrigerant fluid intended to exchange heat with the dielectric fluid.

11. The device as claimed in claim 9, wherein the cooling means further comprises a heat exchanger allowing an exchange of heat between a refrigerant fluid and a coolant fluid, said condenser being configured for the circulation of said coolant fluid for the purposes of exchanging heat with the dielectric fluid.

12. The device as claimed in claim 1, further comprising a heating means for heating said dielectric fluid.

13. A battery pack comprising;
   a plurality of battery cells;
   a device with a dielectric-fluid circuit comprising irrigating means for wetting the surface of said cells with a dielectric fluid that vaporizes at least partially at the surface of the cell,
   wherein the irrigating means cause a circulation of said dielectric fluid so as to bring the dielectric fluid into contact with the surface of the cells,
   wherein the irrigation means comprise sprinkler nozzles for sprinkling the dielectric fluid, in the liquid phase, and
   wherein the sprinkler nozzles are configured to be positioned between each of the battery cells so as to spray the dielectric fluid onto lateral faces of the cells.

* * * * *